June 28, 1960  W. W. STUBBS  2,942,704
APPARATUS FOR ASSEMBLING LUMINOUS CEILINGS
Filed May 18, 1955  3 Sheets-Sheet 1

INVENTOR.
Walter W. Stubbs
BY
Webb Mackey & Burden
HIS ATTORNEYS

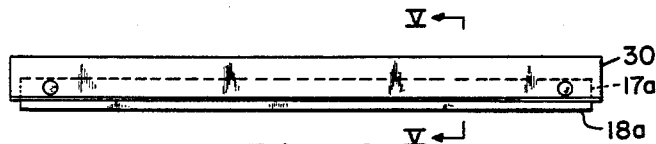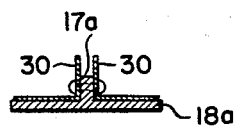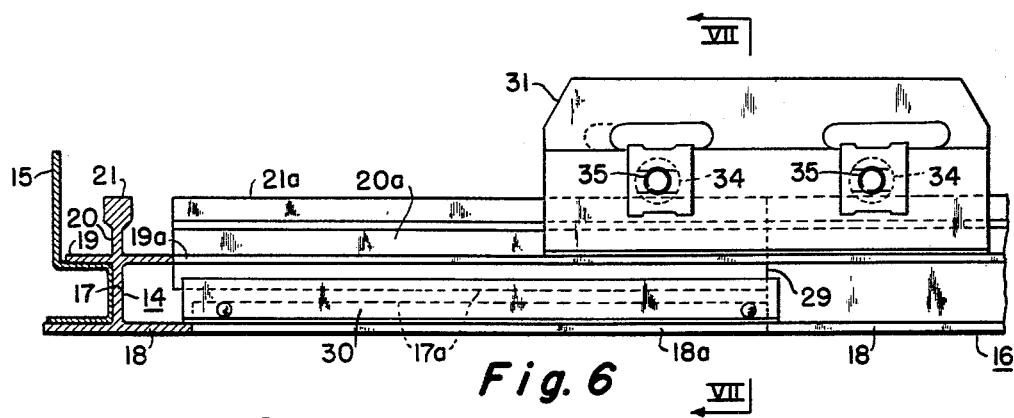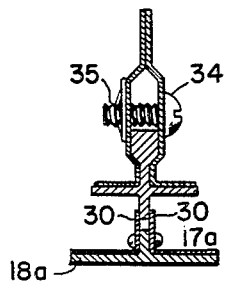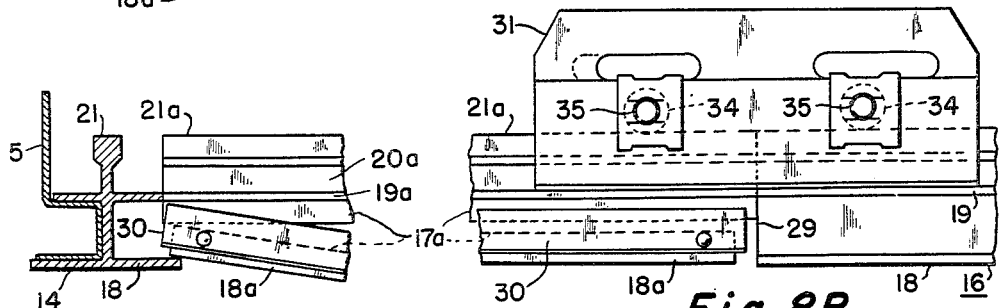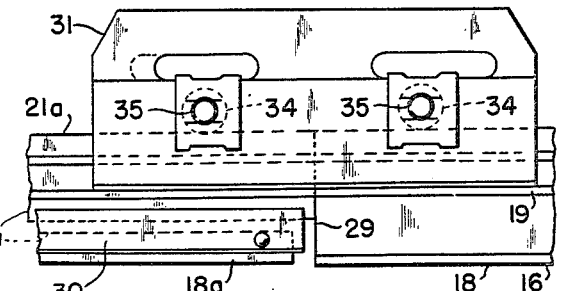

June 28, 1960 W. W. STUBBS 2,942,704
APPARATUS FOR ASSEMBLING LUMINOUS CEILINGS
Filed May 18, 1955 3 Sheets-Sheet 3

INVENTOR.
Walter W. Stubbs

BY
Walt Mackey & Burden
HIS ATTORNEYS

United States Patent Office 2,942,704
Patented June 28, 1960

2,942,704

APPARATUS FOR ASSEMBLING LUMINOUS CEILINGS

Walter W. Stubbs, Irwin, Pa., assignor to Pittsburgh Reflector Company, Pittsburgh, Pa., a corporation of New Jersey Filed May 18, 1955, Ser. No. 509,137

1 Claim. (Cl. 189—88)

This application relates to apparatus for assembling luminous ceilings, more particularly to apparatus for inserting flexible, plastic, translucent sheets of such ceilings into horizontally extending channels which support the plastic sheets.

Luminous ceilings, to which my inventions are applicable, generally comprise flexible, corrugated, translucent, plastic sheets which extend across the ceiling of a room. Light sources, such as fluorescent tubes, are placed above these translucent sheets between the sheets and the structural ceiling of the room, and light passes down through the plastic sheets to light the room. These ceilings may occupy all or part of the ceiling area of a room and are supported on extruded metal channels which extend parallel to each other the length of the area to be covered and which are spaced from each other a distance equal to the width of the plastic sheets.

The extruded metal channels generally have two horizontally extending flanges, one above the other and on each side of a central web. The lower flange supports the plastic sheet and the upper flange prevents the sheet from being lifted off the lower flange by air currents. It is a rather difficult, labor-consuming operation to insert the sheet into the channels after the channels have been placed in position in the room. Also, the plastic sheets have to be removed to clean or replace the lamps above the translucent sheets at intervals.

It has been proposed to provide passageways in the channels through which the plastic sheets can be fed between the two horizontally extending flanges of the supporting channels by cutting away portions of the horizontal flanges and to provide doors for closing these passageways when they are not being used. Supports for holding the plastic sheet adjacent the passageways when it is being inserted between the flanges of the channels have also been proposed.

The doors and plastic sheet supports which have heretofore been proposed have not, however, been satisfactory because they have not been sufficiently secure. There is no difficulty in forming the passageways since this involves only cutting away the lower flange along a short length of channel. However, the lower flanges are generally removed at an end of a channel length because of the easier cutting operation and this makes it difficult to provide a door which will close the passageway securely when the passageway is not being used and which is not conspicuous in the finished ceiling. The problem of providing a secure door is increased if the end of the channel in which a passageway has been formed abuts another channel at right angles, because the upper and lower flanges of a channel are generally of different widths and, therefore, various longitudinal portions of the door must be made of different lengths.

I have provided a door which can be used where a passageway is cut at the end of a channel, which is secure and which is particularly suitable when the channel having the passageway abuts another channel at right angles. I have also invented a support for plastic sheets which can be secured to a channel adjacent a passageway and support the plastic sheet adjacent the passageway when it is being slid down between the flanges of two supporting channels.

In the accompanying drawings, I have illustrated certain present preferred embodiments of my invention, in which:

Figure 4 is a side elevation of a door which can be used to close the passageway shown in Figure 2;

Figure 5 is a section along the lines V—V of Figure 4;

Figure 6 is a view similar to Figure 2, but with the door in place in the passageway through which plastic may be inserted;

Figure 7 is a section along the lines VII—VII of Figure 6;

Figures 8A and 8B show portions of Figure 2 to illustrate how the door may be inserted in the passageway;

Figure 1:
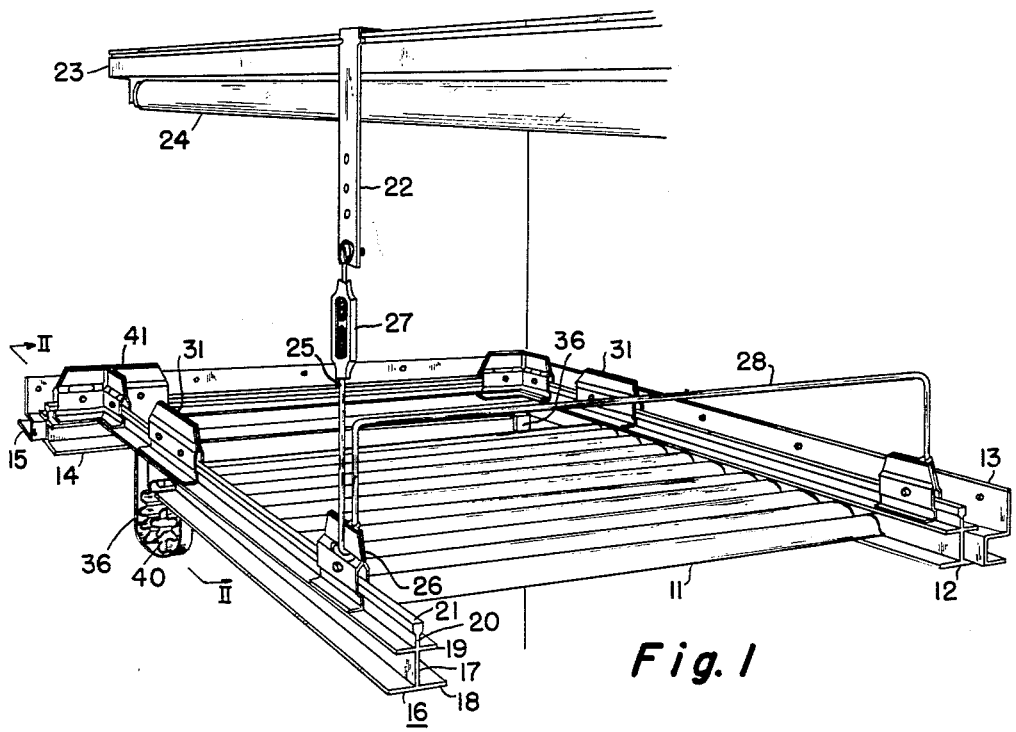
Figure 1 is an isometric view of a portion of a luminous ceiling to which my inventions have been applied.

Figure 1 shows a portion of a luminous ceiling to which my inventions have been applied. The ceiling comprises translucent plastic sheets 11, of which only one is shown in Figure 1. These sheets are placed side by side across the width of the ceiling area and extend the full length of the ceiling area. The plastic sheets are flexible and are supported adjacent their ends by channels 12 supported by wall molding 13 nailed to the walls which extend along the sides of the ceiling area, by channels 14 supported on wall moldings 15 secured to walls which extend across the ends of the ceiling area, and by channels 16 which extend lengthwise of the ceiling area and which are spaced across the ceiling area parallel to the channels 12 and to each other a distance equal to the width of the plastic sheets 11.

As appears in Figure 1, the channels 12, 14, and 16 all have the same cross section. They have a central web 17 and flanges 18 and 19 extending horizontally from each side of the web. A reinforcing fin 20 having a bead 21 along its upper edge extends upwardly from the horizontal flange 19 and in line with the central web 17.

The plastic sheets 11 rest on the flanges 18 which are slightly wider than the flanges 19 which hold the plastic sheets down on the flanges 18 and prevent the sheets from being raised by air currents in the room. As appears in Figure 1, the plastic sheets are corrugated transversely so as to reinforce them crosswise between adjacent supporting channels. The amplitude of the corrugations of the sheeting is made approximately the same as the distance between the flanges 18 and 19 so that the sheets have little or no vertical movement, but, at the same time, the sheets can be slid along between the two flanges.

In the erection of a luminous ceiling, the channels 12, 14, and 16 are first put in place, the channels 12 and 14 being held to the walls of the ceiling by the wall moldings 13 and 15 which make a spring fit between the flanges 18 and 19 of the channels. The intermediate channels 16 are supported at intervals by straps 22 secured to bases 23 of lighting fixtures 24 which are mounted on the structural ceiling by conventional means above the plastic sheets 11. The straps 22 support hooks 25 which carry, at their lower end, clamps 26 which are secured to the fins 20 and beads 21 of the channels. Turnbuckles 27 connect the straps 22 and the hooks 25 to adjust the height of the channels 16. The clamps 26 also carry spacer bars 28 which hold the channels 16 in proper parallel alignment.

The plastic sheets are flexible but, due to the transverse corrugations, have some degree of rigidity across the width of the sheets. They come rolled in long lengths (in the order of fifty feet) and are generally inserted between opposed flanges from adjacent one end of the ceiling and are slid along the lower flanges of the channels while being unrolled. Prior to the suggestion to provide passageways in the lower flanges of the channels, this was a rather difficult operation requiring at least two men. By my invention, one man can feed the plastic between the channels from beneath the channels and thereafter close the passageway securely with an inconspicuous door.

Figure 2:
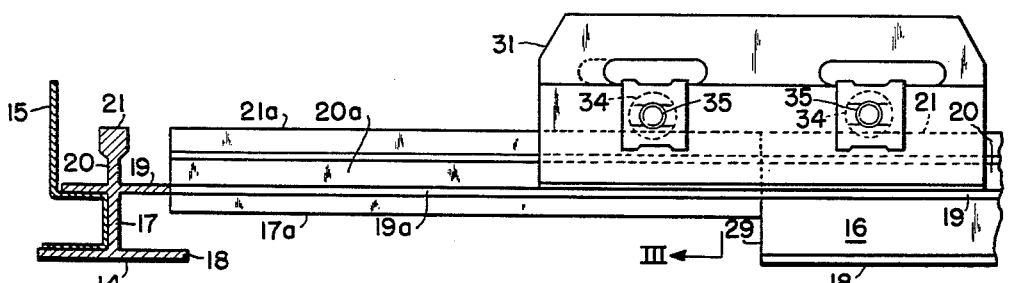
Figure 2 is a section along the lines II—II of Figure 1, with portions removed for clarity and showing a passageway through which the plastic sheet can be inserted into the flange.

Figure 2 illustrates a channel such as the channel 12 or 16, in which a passageway has been formed through which a plastic sheet can be inserted onto the lower flange 18 and between the flanges 18 and 19 of the channel. A short length is cut off the end of the channel, this cut-off portion being slightly longer than the length of the passageway to be formed in the channel. (The cut appears as the line 29 in Figure 2.) The cut-off piece is then cut longitudinally through the web 17 a slight distance below the flange 19. Slitting the web 17 of the short length which has been cut off the channel divides this short length into two portions, an upper portion which includes an upper flange 19a, a fin 20a, and a bead 21a, all of which were parts of the channel from which the short length was cut, and a lower portion comprising the lower flange 18a and the portion of the web 17a adjacent to the flange 18a, also formerly parts of the channel from which the short length was cut.

The lower portion of the short length cut off from the channel, i.e., the web 17a and the flange 18a, may be used to form a door for closing the passageway in the channel for the plastic sheet. It is again cut transversely to shorten it by an amount equal to the difference in width between the flange 18 and the flange 19 of the channels. Two angles 30 are fastened to each side of the web 17a (see Figure 5), which angles extend the full length of the section and slightly beyond each end of the section, as shown in Figure 4.

Figure 3:
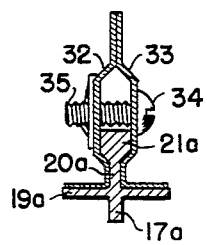
Figure 3 is a section along the lines III—III of Figure 2.

The upper portion of the short length which was cut from the channel is secured to the channel with its beads, flanges, and central web in line with corresponding members on the channel. A clamp 31 for holding the upper portion cut from the channel to the channel is shown in Figures 2 and 3. Referring to Figure 3, it will be seen that this clamp 31 comprises two opposed stamped sheet metal pieces 32 and 33, one on each side of the channel and of the cut-off portion and formed to fit along the sides of the beads 21 and 21a, central fins 20 and 20a, and the tops of the flanges 19 and 19a. Bolts 34 passing through the pieces 32 and 33 and nuts 35 hold the pieces against the channel and the cut-off portion. This clamp has sufficient length to firmly hold both the channel and the short cut-off piece and extends across the cut 29. The outer end of the cut-off portion which abuts the channel 14 is supported by a T-clamp 41 (see Figure 1) which grasps the beads and central fins of the cut-off portion and of the channel 14 in the same manner as the clamp 31.

Figures 8A and 8B show how the door shown in Figure 4 can be inserted in the passageway which has been formed as illustrated in Figure 2. One end of the door is raised, as shown in Figure 8A, and slid a short distance into the space between the flanges 18 and 19 of the transversely extending channel 14, until the other end of the door (Figure 8B) clears the end of the channel at the cut line 29. This end is then raised so that the flange 18a of the door is in line with the flange 18 of the channel, and the door is moved out of the space between the flanges 18 and 19 of the channel 14 so that the ends of the angles 30 rest at one end (Figure 8A) on the lower flange 18 of the channel 14 and at the other end on the lower flange 18 on the channel 16.

Referring to Figure 6, which shows the door in place and closing the passageway, it can be seen that the flange 18a of the door forms a flat portion which is exactly equal to the width and length of the passageway which has been formed in the flange 18 of the channel 16 and is in line with the lower flange 18 of the channel 14 and is also in line with the flange 18 of the channel 16. The angles 30 on the door engage the short portion of the web which extends down from the flange 18a and keep the door in horizontal alignment and the ends of the angles keep the door in vertical alignment. Fine lines where the surfaces abut against each other are the only indications of the door. At the same time, the upper flange 19a of the short length cut from the channel is in line with the upper flange 19 of the channel 16 and with the upper flange 19 of the transverse channel 14, so that a substantially clear space is provided for the plastic sheet between the upper and lower flanges of the channels and of the short length which was cut from the channel to form the passageway and door. A sufficient length of plastic sheet is fed into the channels so that it can extend back into the channel 14 after the door has been placed in position. After the door has been put in position, the plastic sheet is pulled back between the flanges 18a and 19a and into the space between the upper and lower flanges 18 and 19 of the channel 14, so as to close the luminous ceiling completely. There are no light leaks adjacent to the door and the transverse channel 14.

In forming a passageway for inserting plastic sheet into a channel, it is not necessary to cut off a short length from the channel before slitting the central web longitudinally. A passageway can also be formed by slitting the web in from the end of the channel and making a transverse cut through the lower flange and adjacent portion of the web to meet the longitudinal cut. This, of course, is a more difficult cutting operation than making a complete cut through the channel and then cutting longitudinally the web of the cut-off portion.

Figure 9:
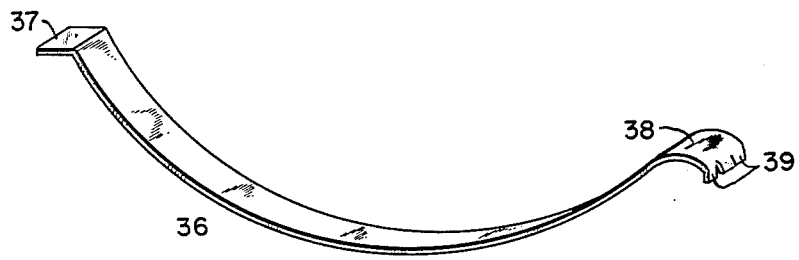
Figure 9 is an isometric view of a support for holding plastic sheet adjacent an opening in the channel.
Figure 10:
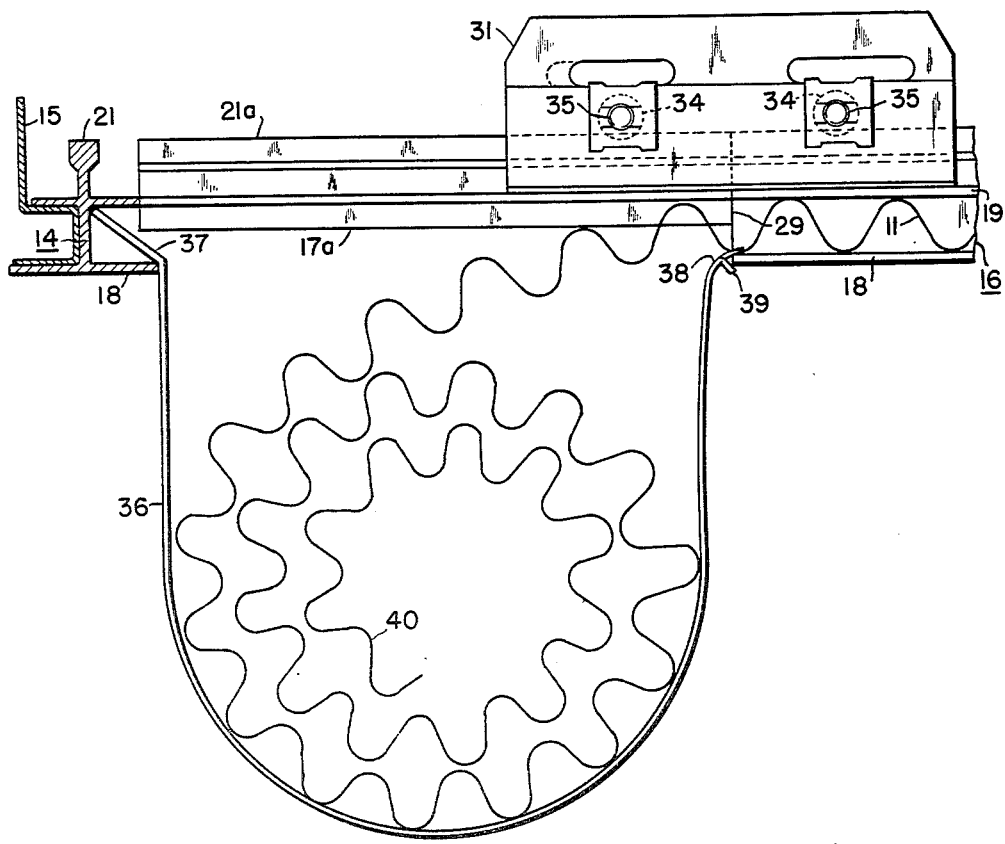
Figure 10 is a section along the lines II—II of Figure 1, with a portion removed for clarity.

As noted, the plastic sheets are in long lengths and are shipped in rolls. It is much easier to feed the sheets through the passageways cut in the channels, as described, if the rolls can be held beneath the channels adjacent the passageways. I have invented a simple strap 36 (see Figure 9) which can be easily mounted on the channels beneath the passageways. Referring to Figure 9, the strap 36 is made of spring metal and has a small permanent longitudinal curve, as shown in Figure 9. One end of the strap is bent over to form a flat end portion 37, and the other end has a sharp curl 38. The extreme end having the curl is notched and tongues 39 are bent away from the plane of the balance of the strap along each side adjacent the end. The length of the strap is considerably greater than the length of the passageway in the channel beneath which the strap is to be secured, so that when the strap is installed on a channel beneath a passageway, it is bent into substantially a U shape, as shown in Figure 10. Also as shown in Figure 10, the flat end 37 rests on the lower flange 18 of a transversely extending channel, such as the channel 14 in Figure 1. The flat end extends diagonally upwards to the upper horizontal flange to prevent the strap from tilting from a vertical position. At the other end of the strap, one of the tongues 39 engages the edge of the lower flange 18 on the channel 16 adjacent the other end of the passageway. A similar strap is installed in a similar passageway in the next adjacent channel, and a roll 40 of plastic sheet can be placed between the two brackets. The sheet can be easily slid down along the channel between the flanges 18 and 19.

From the foregoing, it is apparent that I have invented apparatus for installing luminous ceilings which greatly facilitates the placing of the translucent sheets of the luminous ceilings in the channels which support the plastic sheets. By my inventions, plastic sheets can be inserted from beneath the horizontal channels and I provide doors which securely cover the passageways through which the plastic sheets are inserted and which substantially conceal the passageways when they are not in use. When the doors are in place, there are two horizontal flanges across the passageway between which the plastic sheet extends. The sheet is fully supported and cannot buckle upwardly and cause a light leak because it is restrained by the two flanges. The doors are simply constructed and can be easily installed and removed when desired. The straps which I have devised for mounting beneath the passageways for holding the rolls of plastic sheets enable one man to do the entire job of installing the plastic sheets in the channels. These straps are likewise simple to manufacture and are easy to install and remove.

While I have described certain present preferred embodiments of my invention, it is to be understood that they may be otherwise embodied within the scope of the appended claim.

I claim:

Structure for assembling luminous ceilings having a flexible translucent sheet horizontally supported along its edges on opposed flanges extending horizontally from two parallel channels, said two channels abutting and extending generally transversely to a channel extending across the end of the sheet and having a flange extending outwardly toward and under the sheet, said two parallel channels each having a central web and an integral flange extending outwardly therefrom, said assembling structure comprising said two parallel channels, said transversely extending channel, opposed passageways formed in the ends of the two channels adjacent the transverse channel, said passageways being formed by removing a length of the supporting flanges from one end of each of the two parallel channels and a portion of the central web from which the removed flange portions extended, and a door closing each passageway, said door having a flat portion of such length and width as to fill the space left by removal of said flange portion, a fin extending from the flat portion corresponding in position on said flat portion to the portion removed from said central web and members secured on each side of said fin and extending beyond each end of the door and resting at one end on the supporting flanges of one of the two parallel channels and at the other end on said flange of said transversely extending channel, said members also contacting the sides of the remaining web portion of one of the two parallel channels whereby said flat door portion is held in line with the adjacent supporting flange of one of the two parallel channels.

References Cited in the file of this patent

UNITED STATES PATENTS

| | | |
|---|---|---|
| 410,856 | Sagendorph | Sept. 10, 1889 |
| 1,817,619 | Greenwald | Aug. 4, 1931 |
| 1,826,133 | Hatch | Oct. 6, 1931 |
| 1,950,250 | Kinney | Mar. 6, 1934 |
| 2,065,068 | Gudeman | Dec. 22, 1936 |
| 2,066,205 | Keating | Dec. 29, 1936 |
| 2,150,344 | Schilling | Mar. 14, 1939 |
| 2,610,365 | Manley | Sept. 16, 1952 |
| 2,689,630 | Drury | Sept. 21, 1954 |
| 2,691,720 | Simmons | Oct. 12, 1954 |

OTHER REFERENCES

Sweet's Catalog, 1954, section 30a/Lu, page 8, Luminous Ceiling Inc.